Nov. 23, 1926.　　　　C. B. PRICHARD　　　　1,608,136
GRAIN CLEANER
Filed Nov. 23, 1923　　　2 Sheets-Sheet 1

Inventor
Charles B. Prichard
By Fischer & Lagaard
Attorneys

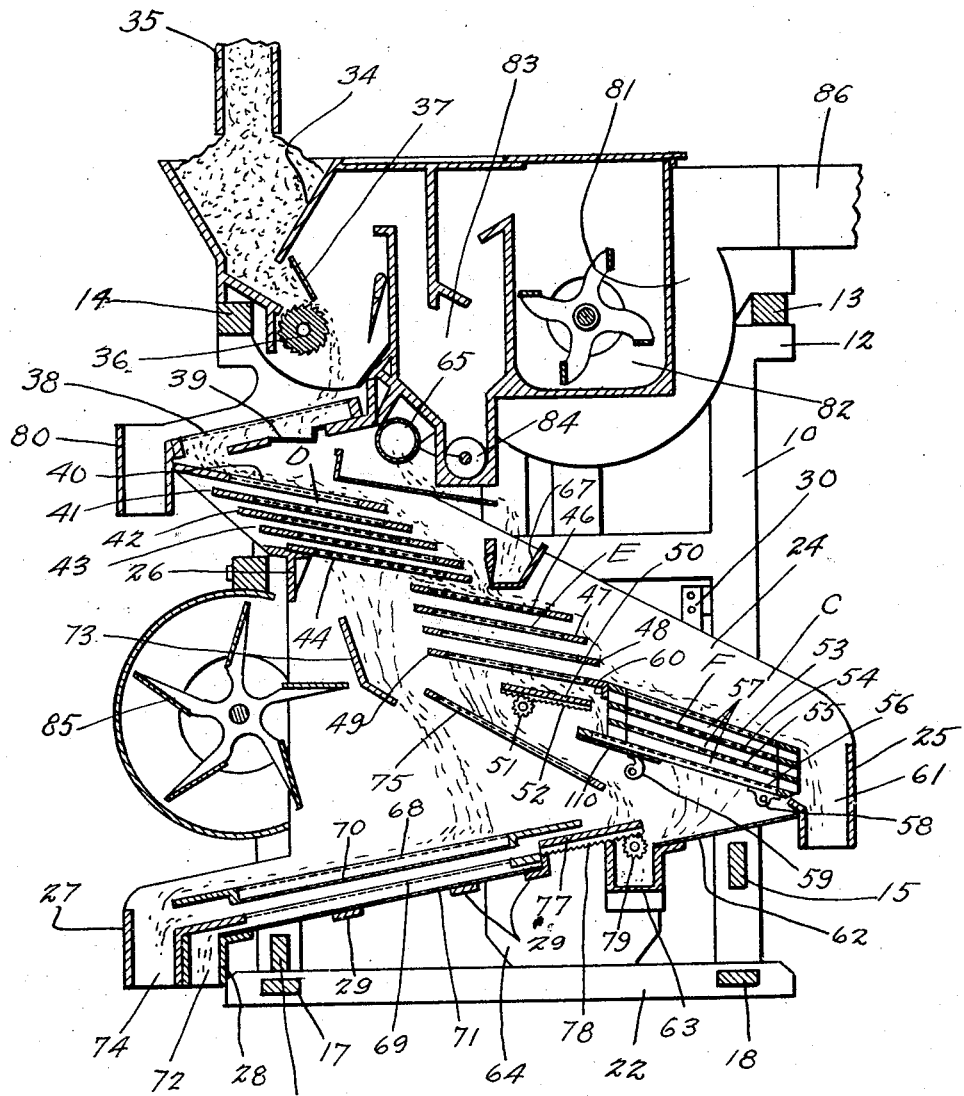

Patented Nov. 23, 1926.

1,608,136

UNITED STATES PATENT OFFICE.

CHARLES B. PRICHARD, OF GARDNER, NORTH DAKOTA.

GRAIN CLEANER.

Application filed November 23, 1923. Serial No. 676,522.

My invention relates to grain cleaners and has for its object to provide a cleaner adapted to remove oats, king-head and small seeds from wheat, rye and other grains, whereby the greater percentage of the foreign materials are removed without reducing the capacity of the machine.

Another object of the invention resides in providing a plurality of sieves and of arranging the sieves relative to one another and of varying the inclination of the sieves so that the sieves are practically flooded throughout their entire lengths with grain whereby the oats and foreign material are floated along the tops of the sieves and tailed over from the same at the end of the last sieve.

Another object of the invention resides in providing a number of gangs of sieves and arranging said sieves to discharge one upon the other, said sieves being further arranged to receive a portion of the throughs from the preceding upper gang of sieves.

A still further object of the invention resides in adjustably mounting said gangs of sieves so that the angle of inclination of the same relative to one another may be varied at will.

A still further object resides in providing three gangs of sieves, the first and second gangs being fixed relative to one another while the third gang is adjustable relative to the second gang so as to vary the angle of inclination relative thereto.

Another feature of the invention resides in positioning the second gang of sieves rearwardly of the lower edge of the first gang so that the said sieves serve as a cutoff for collecting a certain portion of the throughs from the first gang as well as the entire tailings from the first gang of sieves.

A still further object resides in providing a cutoff board below the second gang of sieves adapted to discharge the throughs from the lower half of the said gang of sieves to the lower sieve of the third gang.

Other objects of the invention reside in the detailed construction of the same as specifically brought out in the specification and claims.

In the drawings illustrating my invention in one form:

Figure 2 is a vertical sectional view of the structure shown in Figure 1.

Figure 1:
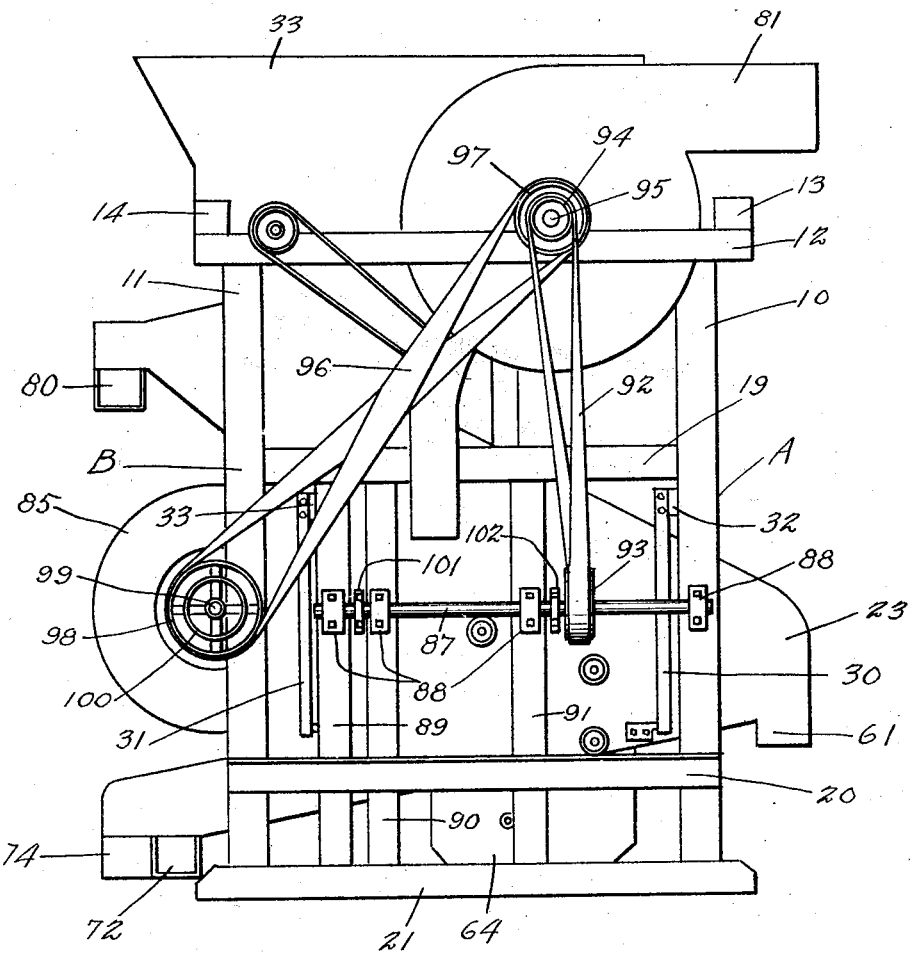
Figure 1 is a side elevational view of a grain cleaner embodying my invention.

In the cleaning of wheat and rye as well as other grains, I have found that when a cleaner employing a number of short sieves is used that the oats and king head is more effectively separated if the sieves can be operated with the grain flooded along the same, and that as soon as the grain has been shaken through the sieve and only the oats and other tailings remain upon the sieve that the tendency is for the foreign materials to also pass through the sieves and again partially mix with the clean grain. Where two gangs of sieves have been formerly employed the upper gang, due to the fact that the grain was flooded upon the same, would be more efficient in operation in the separation of the foreign matter from the grain, whereas the lower gang of sieves would only effectively separate the foreign material for a short distance along the surface of the same, after which the foreign materials would also tend to pass through the sieves and again become mixed with the clean grain. In my invention I have overcome these difficulties by providing three gangs of sieves and by placing the second gang of sieves rearwardly of the first gang so that any of the foreign material at the lower end of the first gang of sieves which might pass through the same would be discharged upon the upper sieve of the second gang, and by further arranging the third gang so that the second gang discharged upon the same. In addition, I have provided a cutoff board in conjunction with the second gang which is adapted to discharge the throughs from the lower sieve of the second gang to the lower sieve of the third gang, and I have further arranged the third or lower gang of sieves so that the same may be adjusted relative to the second gang to vary the angle of inclination thereof, permitting the stock to pass more rapidly or slowly over the last gang of sieves depending on the cleanness of the grain.

For illustrating the application of my invention I have shown a grain cleaner A which consists of a framework B comprising uprights 10 and 11 connected together by means of rails 12, 13, 14, 15, 16, 17 and 18 as well as other cross members 19 and 20. This framework supports the structure of my invention as will presently be described and is supported upon two skids 21 and 22 which may be bolted to the floor of the building in which the machine is to be erected.

Within the framework A is supported a shaking shoe C which consists of side walls 23 and 24 connected together by means of end members 25 and 26, 27 and 28 as well as by slats 29 extending across the bottom thereof. This shoe is supported upon a number of vertical hangers 30 and 31 which are secured to the uprights 10 and 11 at 32 and 33 and which are pivotally attached to the side walls 23 and 24 of the shoe C. These hangers are of a flexible nature permitting the entire shoe C to be reciprocated in a transverse direction. Within the shoe C is mounted the sieves and other separating structure of the invention as will presently become apparent.

At the upper portion of the frame member A resting upon the rails 12 and 14 is mounted a casing 33, a portion of which forms a feed hopper 34 in which the grain to be cleaned is deposited from the bin or other place of storage in which the grain to be cleaned is kept. Hopper 34 discharges the grain against a force feed roll 36 which operating in conjunction with an automatic feed gate 37 serves to discharge the grain in a uniform, even sheet upon a scalper sieve 38 fixedly mounted in the shoe C. The feed mechanism illustrated in the drawings being of ordinary construction has not been shown in detail in this application as it is apparent that any suitable feed mechanism may be employed which will feed the grain in a uniform manner upon the scalper sieve 38. All of the stones, cobs, sticks of wood and other large substances which may be mixed with the grain pass over the scalper sieve 38 and are discharged through a spout 80 to any suitable bin or to a receiver where the same may be sacked, while the grain and smaller foreign materials pass through the said sieve and upon a pan 39 positioned below the same.

Within the shoe C is supported three gangs of sieves indicated at D, E and F respectively. These gangs of sieves are all positioned in inclined relation, the gang D being positioned at the uppermost portion of the shoe C while the gang E is positioned near the center of the same and the gang F at the bottom thereof. These gangs of sieves are adapted to discharge to one another as brought out in the drawings and as will be further explained in detail at a later time. As will be noted, in Figure 2 the upper gang of sieves D consists of five sieves 40, 41, 42, 43, and 44, which slope toward the rearward end of the machine. The pan 39 is adapted to discharge upon the upper end of the upper sieve 40 whereupon the grain flows along the said upper sieve, flooding the same throughout the length thereof. The perforations or mesh of the sieves employed is such that the oats, king head and other foreign materials which are larger than the grain float along with the flooded grain as the same travels over the upper sieve 40, while the larger portion of the wheat and small seeds pass directly through all of the sieves and are discharged through the same at or near the upper end thereof. Toward the lower end of these sieves a certain amount of the oats and other foreign material is apt to leak through the sieves instead of tailing over the same, which is handled as will be presently described.

A second gang of sieves as indicated at E comprises four sieves 46, 47, 48 and 49 which are arranged in progressive formation, each of said sieves being positioned below and somewhat outwardly beyond the sieve immediately above the same. The uppermost sieve 46 is so positioned relative to the lower sieve 44 of gang D that the oats and other foreign materials which pass through the upper gang of sieves D instead of tailing over the same will be collected thereby and caused to pass along the said second gang of sieves E together with the tailings from the gang of sieves D.

Where two gangs of sieves are employed, one short and one long, it is usually found that the flooding action of the grain along the second or long gang of sieves usually terminates before the grain reaches the extreme end of the second gang of sieves, so that the action for causing the tailings to pass through the sieves is greatly accentuated. In my invention the second gang of sieves is formed relatively shorter than is ordinarily the case and the third gang of sieves F employed in conjunction therewith to provide the necessary sieve surface. As in the case of the upper gang of sieves D the grain is maintained flooded throughout the length of the second gang E, at the same time a portion of the foreign material leaks through the sieves in gang E at the lower end thereof. To take care of this action a cutoff board 50 is utilized which is held in adjustable position by means of gear wheels 51 operating upon racks 52 secured to said board, whereby said cutoff board may be slid along the bottom of the lowermost sieve 49 of this gang of sieves to separate the throughs from said sieves at whatever point the separation is required.

Figure 3:
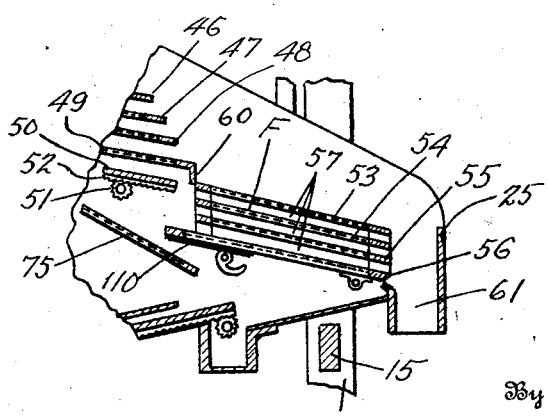
Figure 3 is a fragmentary view of a portion of the device shown in Figure 2.

Both of the gangs of sieves D and E are secured in the shoe C in fixed relation, being spaced apart the required distance and being so arranged that said sieves may be readily removed for cleaning, inspection and repair whenever required. Such construction being well known in the art, has not been illustrated in detail in this application. The lower gang of sieves F, however, which comprise four sieves 53, 54, 55 and 56 are all secured together by spacer blocks 57, permitting said gang of sieves F to be moved as a unit. This gang of sieves is pivotally mounted in the shoe C between the side walls 23 and 24 thereof by means of hinged connections 58 secured to the lowermost sieve 56 and to said side walls. With this arrangement the gang of sieves F may be oscillated about the hinged connections 58 to cause the uppermost portions of said sieves to be raised and lowered at will. For operating the same and for supporting this gang of sieves in its adjusted position I provide a number of cams 59 which may be simultaneously rotated and which engage the lowermost portions of the sieve 56 and so operate to raise or lower the entire gang of sieves as the occasion demands. When the gang of sieves F is in its highest position as shown in Figure 2 sieve 53 lies in alinement with sieve 49, while the inclination of the said gang of sieves F is greater than that of the sieves E or D. When the gang of sieves F is in its lowermost position as shown in Figure 3 the upper end of the sieve 53 is considerably below the lower end of the sieve 49 and the angle of inclination of the gang of sieves F is materially reduced from that shown in Figure 2. A strip of material 60 is secured to the lower end of the lower sieve 49 to fill in the gap that would be made when the back gang is dropped down, which is clearly shown in Figure 3.

As the grain tails over the gang of sieves E and upon the gang F the same is maintained flooded practically throughout the length of said lower gang of sieves F, due to the fact that these sieves may be inclined at a greater angle than the remainder of the sieves. In the ordinary form of grain cleaners the second gang of sieves is usually composed of wire screen, whereas in my invention I find that the perforated metal sieve on both of the gangs E and F operates more satisfactorily. The perforations in the gang of sieves F are of such a nature that all of the wheat which might be present in the tailings from the gang E pass through this last named gang of sieves F so that the tailings from this gang of sieves consist entirely of oats, king head and other foreign materials. These tailings are discharged through a spout 61 positioned at the lowermost end of the rearward portion of shoe C.

As before stated, a portion of the oats and foreign materials present upon the gang of sieves E passes through the same and is discharged upon the cutoff board 52 where the same is discharged upon the lower sieve 56 of gang F, said sieve being made longer than the rest and projecting forwardly of the same. In this arrangement all of the oats and foreign material is prevented from passing through the first and second gangs of sieves D and E and is finally discharged upon the third gang of sieves F thereby causing only grain and small seeds to pass directly through the first and second gangs of sieves.

Due to the fact that the perforations in the last gang of sieves F are of such formation that all of the wheat is caused to pass through the same, a certain amount of foreign material also passes through these sieves which together with the wheat is deposited upon a repeat pan 62 which feeds the mixture of wheat and foreign materials to spout 63 directing the stream to the boot of a repeat elevator 64 which in turn delivers it to a spout 65 feeding it upon a pan 66 positioned above the upper gang of sieves D. This pan delivers the repeat stock to a feed hopper 67, which in turn feeds the same upon the upper screen 46 of the gang E, where said stock is delivered in a uniform stream and flows along over the gangs E and F as before, together with the tailings from the gang of sieves D. In this manner a thorough separation of the oats and other similar foreign materials is effected, so that only the grain and small seeds pass through the sieves so specified.

For separating the small seeds from the grain two seed screens 68 and 69 are provided which are arranged above one another in spaced relation and are positioned at the lowermost portion of the shoe C. Below the screen 68 is positioned a pan 70 which collects the throughs from said sieve and similarly below the screen 69 is positioned a pan 71 which also collects the throughs from this screen. These pans are arranged to discharge into a seed spout 72 which delivers the seed to such bins as may be provided for the purpose. The grain which passes through the upper gang of sieves D is guided by means of a baffle 73 so that the same is discharged toward the upper end of the screen 68. As the stock flows over this sieve the grain tails over the same and is discharged into a clean grain spout 74 while the small seeds and other particles of foreign materials smaller than the grain pass through the screen 68 and upon the pan 70 where the same is discharged to the spout 72. In a similar manner the grain which is discharged through the second gang of sieves E is directed by means of an inclined screen chute 75 upon a board 77 which discharges upon the seed screen 69, which as shown in Figure 2 projects outwardly beyond the upper end of the seed screen 68. Seed screen 69 is so arranged that the tailings from the same which contains the clean grain is also discharged in the spout 74 so that all of the clean grain passes into this spout, while the fine seeds which pass through seed screen 69 and upon the pan 71 are discharged into the spout 72 together with the seeds from the pan 70. It will be noted that the chute 75 is positioned below the cutoff board 50 and the gang of sieves E so that the same discharges below the lowermost sieve 57 of gang F and upon the board 77. This board may be adjusted similarly to the cutoff board 50 by means of a rack 78 and a pinion 79. To prevent the throughs from the sieve 56 from discharging upon the board 77 a blank screen 110 is employed which is attached to the lower surface of said sieve 56 at the upper end thereof.

For removing the larger portion of the dust and lighter materials from the grain I employ a pair of blowers 81 which are positioned in a blower chamber 82 formed in the casing 33, containing the feed hopper 34. These blowers are adapted to suck the air through the stream of stock as the same leaves the force feed roll 36 and to cause the dust-laden air to pass through a settling chamber 83 where the dust falls by gravity to a conveyor 84 by means of which the same may be removed from the machine. In addition, another blower 85 is provided which directs a blast of air through the various gangs of sieves D, E and F as in the ordinary type of grain cleaner. To give maximum efficiency the chute 75 is formed of a fine perforated material which permits the air from the blower 85 to pass through the same without allowing the stock flowing over the same to leak through. The air from the blowers 81 is discharged into the ducts 86 where the same may be passed through the ordinary dust collectors or discharged into the open as required.

For driving the various elements of my invention I provide a counter shaft 87 which is mounted in bearings 88 secured to the uprights 10 and 11 and to posts 89, 90 and 91 positioned between the cross members 19 and 20. This counter shaft is driven by means of a belt 92 which passes over a pulley 93 secured to said counter shaft and another pulley 94 mounted upon shaft 95 which carries the blowers 81. This shaft is driven by means of a belt 96 which passes over a pulley 97 attached to shaft 95 and another pulley 98 mounted upon shaft 99 to which the blower 85 is attached. A pulley 100 secured to this shaft may be directly coupled by belting or other means to the source of power from which the cleaner is to be driven. The feed roll 36, elevator 64 and the dust conveyor 84 may all be driven either from the shaft 99 or the shaft 95 by suitable belts and pulleys which have not been shown in this application, but which is well known in the art. Shaft 87 carries two eccentrics 101 and 102 which are connected to the shaking shoe C and are adapted to cause the said shoe and the sieves mounted therein to reciprocate in a transverse direction as the machine is operated so as to cause the grain to be effectively separated and the foreign material to be removed therefrom.

The advantages of my invention are manifest. An extremely effective and efficient device is provided for cleaning grain, the capacity of which device is not reduced in the operation of the same. The principle of flooding the grain on the sieves is practically maintained throughout the entire operation of the machine so that the efficiency of the machine is exceedingly great. By adjusting the lower gang of sieves the grain can be made to travel more rapidly over the same so as to regulate the flow of the stock over said sieves and so maintain the flooding action throughout practically the entire sieve surface. By the employment of the perforated chute the air blast is permitted to pass through the sieves without obstruction producing the desired results.

In accordance with the patent statutes I have described my invention, illustrating the best embodiment thereof, but I desire to have it understood that the invention can be carried out by other means and applied to uses other than those above set forth within the scope of the following claims.

I claim:

1. A grain cleaner comprising a gang of sieves positioned in inclined relation, a second gang of sieves positioned below said first gang and arranged with a portion thereof projecting inwardly beyond the lowermost edge of said upper gang, a third gang of sieves at the end of said second gang of sieves, said third gang being arranged with its upper sieve in substantial alinement with the lower sieve of said second gang, means for dropping said lower gang of sieves below the surface of the lowermost sieve of said second gang.

2. A grain cleaner comprising a gang of sieves positioned in inclined relation, a second gang of sieves positioned below said first gang and arranged with a portion thereof projecting inwardly beyond the lowermost edge of said upper gang, a third gang of sieves at the end of said second gang of sieves, said third gang being arranged with its upper sieve in substantial alinement with the lower sieve of said second gang, means for dropping said lower gang of sieves below the surface of the lowermost sieve of said second gang, the lowermost sieve of said third gang projecting inwardly beyond the other sieves of said third gang and means for discharging a portion of the throughs of said second gang of sieves upon the projecting end of said lowermost sieve of said third gang.

3. A grain cleaner comprising a gang of sieves positioned in inclined relation, a second gang of sieves positioned below said first gang and arranged with a portion thereof projecting inwardly beyond the lowermost edge of said upper gang, a third gang of sieves at the end of said second gang of sieves, said third gang being arranged with its upper sieve in substantial alinement with the lower sieve of said second gang, means for dropping said lower gang of sieves below the surface of the lowermost sieve of said second gang, said lowermost sieve of said third gang projecting inwardly beyond the other sieves of said third gang and a cut-off board for discharging a portion of the throughs of said second gang of sieves upon the projecting end of said lowermost sieve of said third gang.

4. A grain cleaner comprising a plurality of gangs of sieves arranged one below the other at the discharge ends thereof, a number of seed screens positioned below said sieves and extending upwardly toward the lowermost gang of sieves, said seed screens being positioned one above the other, a member extending upwardly beyond the upper seed screen and adapted to discharge upon the lower seed screen, a guide adapted to discharge the throughs from one of said gangs of sieves upon the upper seed screen, a perforated chute adapted to discharge the throughs from another of said gangs of seed screens upon said member communicating with said second seed screen and a blower adapted to force air through said perforate member and through the various sieves of said gangs of sieves.

CHARLES B. PRICHARD.